(12) United States Patent
Chan

(10) Patent No.: US 6,943,892 B2
(45) Date of Patent: Sep. 13, 2005

(54) INSTRUMENT HAVING A MULTI-MODE OPTICAL ELEMENT AND METHOD

(75) Inventor: Winston Kong Chan, Princeton, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 10/763,982

(22) Filed: Jan. 23, 2004

(65) Prior Publication Data

US 2004/0150830 A1 Aug. 5, 2004

Related U.S. Application Data

(60) Provisional application No. 60/443,294, filed on Jan. 29, 2003.

(51) Int. Cl.[7] .................................................. G01B 9/02
(52) U.S. Cl. ....................................................... 356/479
(58) Field of Search ................................ 356/477, 479, 356/451, 452, 301

(56) References Cited

U.S. PATENT DOCUMENTS

| | | |
|---|---|---|
| 5,351,121 A | 9/1994 | Baer et al. |
| 6,014,215 A | 1/2000 | Kempen et al. |
| 6,223,063 B1 | 4/2001 | Chaiken et al. |
| 2003/0161574 A1 | 8/2003 | Aksyuk et al. |
| 2004/0150830 A1 | 8/2004 | Chan |

FOREIGN PATENT DOCUMENTS

WO    WO 02/071113    9/2002

OTHER PUBLICATIONS

Enejder, et al., Blood analysis by Raman spectroscopy, Optics Letters, vol. 27, No. 22, Nov. 15, 2002, pp. 2004–2005.

Carter, et al., "High detectivity InGaAsSb pin infrared photodetector for blood glucose sensing", Electronic Letters, vol. 36, No. 15, Jul. 20, 2000.

Heaton, Harold I., "Interferometric Raman spectrometry with fiber waveguides", Applied Optics, vol. 36, No. 27, Sep. 20, 1997, p. 6739–6750.

Shafer–Peltier, et al., "Toward a Glucose Biosensor Based on Surface–Enhanced Rama Scattering", J.Am. Chem Soc. 2003, vol. 125, pp. 588–593.

Chan, et al., "Low Noise InGaAsSb Photodetectors for Optical Blood Glucose Sensing", Meeting Abstracts, The 198th Meeting of The Electrochemical Society, Oct. 22–27, 2000, Phoenix, Abstract No. 1178.

Berger, et al., "Multicomponent blood analysis by near–infrared Roman spectroscopy", Applied Optics, vol. 38, No. 13, May 1, 1999, pp. 2916–2926.

*Primary Examiner*—Samuel A. Turner
(74) *Attorney, Agent, or Firm*—William J. Burke

(57) ABSTRACT

An instrument including a scannable mirror employs multimode optical fibers and an optical coupler. Modal dispersion, e.g., from the multimode optical fiber, is reduced by a method employing deconvolution. The scannable mirror may employ a mirror movable in an optical waveguide or an optical fiber wound on an expandable core.

27 Claims, 5 Drawing Sheets

INSTRUMENT HAVING A MULTI-MODE OPTICAL ELEMENT AND METHOD

This Application claims the benefit of U.S. Provisional Application Ser. No. 60/443,294 filed Jan. 29, 2003.

The present invention relates to an interferometer and, in particular, to an interferometer having a scanning mirror.

Optical spectroscopy is a sensitive and selective method of detecting and identifying molecules. It is rapid and requires little or no sample preparation, and is amenable to continuous and real-time monitoring. Optical spectroscopy has many applications, including the detection of chemical and biological materials, the determination of a person's metabolic status, the monitoring of drinking water purity, and other analytical applications. Known optical coherence interferometry utilizes a mirror that scans back and forth rapidly (e.g., at 30–100 Hz) over a small distance (e.g., about 1 mm or less), but is not susceptible to being used in a miniature instrument. In spite of its power, optical spectroscopy is not widely used because spectrometers with useful resolution are laboratory instruments that are too big, too fragile, and too sensitive to vibration, to be utilized in uncontrolled environments, such as might be encountered if the instrument were to be taken into the field. Moreover, a cryogenically-cooled detector is often required, which presents a problem for use outside of the laboratory.

As a result, other molecular detection and identification methods and instruments, such as ion mobility spectrometry, surface acoustic wave sensing and gas chromatography, typically are utilized instead. These methods and instruments have their limitations and drawbacks, such as requiring the proper surface coating for the surface acoustic wave sensor. A field deployable optical spectrometer, if available, would add to the arsenal of analytical tools, and will greatly enhance the ability to identify and monitor chemicals in the environment.

Interferometric Raman spectrometry has been proposed with single-mode optical fiber elements, e.g., see H. I. Heaton, "Interferometric Raman Spectrometry with Fiber Waveguides," *Applied Optics*, Vol. 36, No. 27, 20 Sep. 1997, pages 6739–6750. Single-mode optical fibers, however, tend to be more expensive and more sensitive to physical effects than are multi-mode optical fibers, and the proposed instrument is reported as not yet practical. Problems of scanning linearity and reproducibility are reported for the as yet laboratory-grade system. Id. at page 6749. In addition, the use of single-mode optical fiber avoids the modal dispersion caused by multi-mode optical fiber and the effect of the modal dispersion that tends to degrade the resulting spectrum of the sample being measured.

Thus, there is a need and desire for an optical spectrometer that is rugged, is small enough to be hand-held, and has high spectral resolution. It would also be desirable that such spectrometer surpass in spectral resolution, wavelength range and throughput, known available commercial hand-held spectrometers.

Accordingly, there is a need for an accurate spectrometer and/or interferometer that lends itself to being implemented in a small and/or portable instrument having reasonable accuracy.

To this end, the instrument of the present invention comprises first and second lengths of multimode optical fiber and an optical coupler for coupling light to and from the first and second lengths of multimode optical fiber. A first mirror at a second end of the first multimode optical fiber reflects the light therein, and a second mirror at a second end of the second multimode optical fiber reflects the light therein. At least the first mirror is scannable. A detector coupled to the optical coupler receives at least a portion of the light reflected from the first and second mirrors and produces an output signal, and a processor coupled to the detector reduces the effect of modal dispersion of the output signal.

According to a further aspect, a method of the present invention comprises:

providing a source of substantially monochromatic light;

detecting spectral data responsive to the substantially monochromatic light, the spectral data including effects of modal dispersion;

detecting a response function responsive to the substantially monochromatic light, the response function including effects of modal dispersion; and convolving the spectral data and the response function for producing deconvoluted spectral data wherein effects of modal dispersion are reduced.

BRIEF DESCRIPTION OF THE DRAWING

The detailed description of the preferred embodiments of the present invention will be more easily and better understood when read in conjunction with the FIGURES of the Drawing which include.

Figure 1:
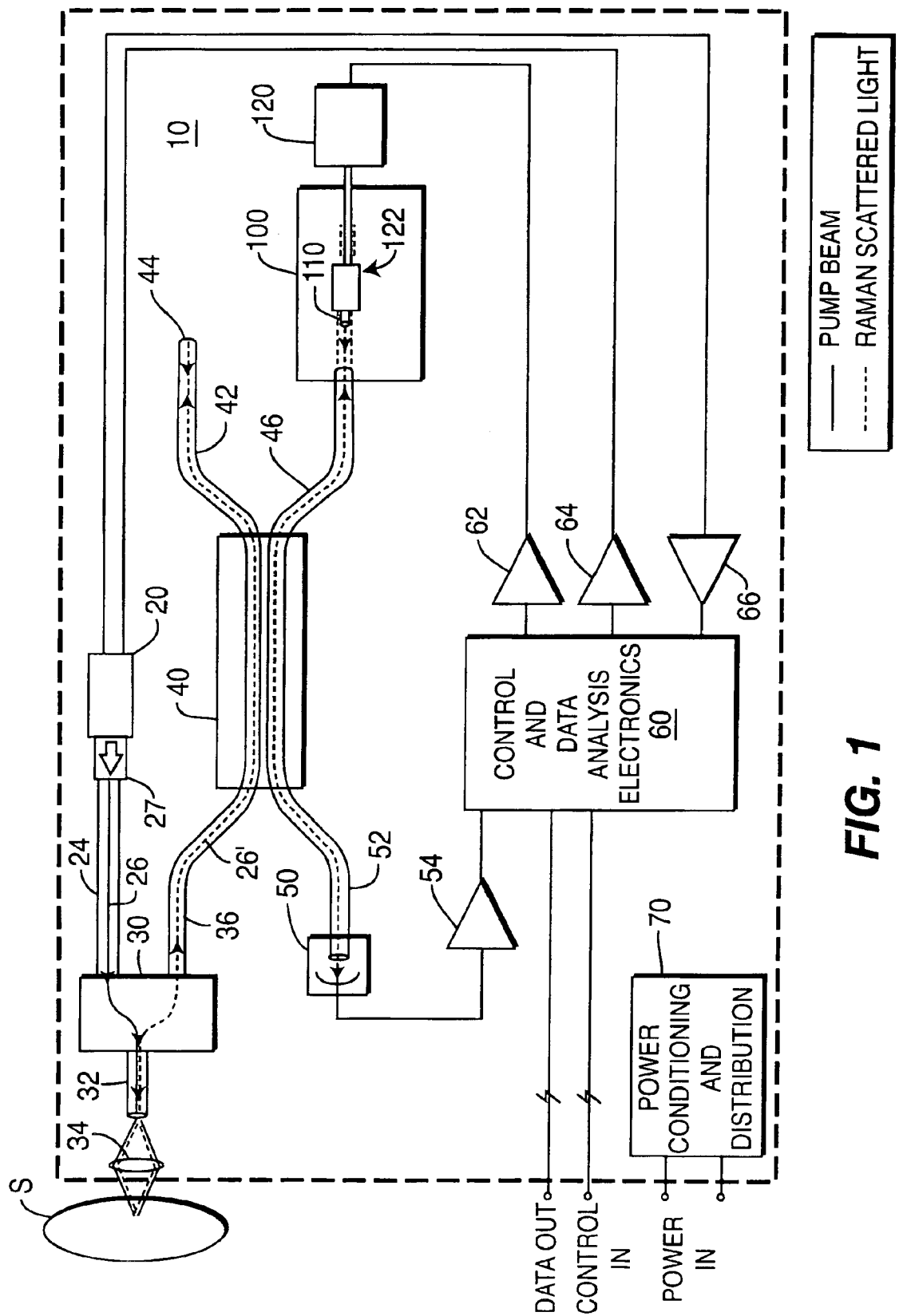
FIG. 1 is a schematic block diagram of an example embodiment of a spectrometer including an interferometer and scanning mirror in accordance with the present invention.

In the Drawing, where an element or feature is shown in more than one drawing figure, the same alphanumeric designation may be used to designate such element or feature in each figure, and where a closely related or modified element is shown in a figure, the same alphanumerical designation primed or designated "a" or "b" or the like may be used to designate the modified element or feature. It is noted that, according to common practice, the various features of the drawing are not to scale, and the dimensions of the various features are arbitrarily expanded or reduced for clarity.

DESCRIPTION OF THE PREFERRED EMBODIMENT(S)

Fourier transform spectroscopy is a powerful method for obtaining the absorption and Raman spectra of chemical compounds, and has advantages over dispersive methods of spectroscopy including: Use of a single detector rather than a detector array, simultaneous detection of all incident light rather than a small spectral band, high spectral resolution without spatial filtering, and readily adjustable spectral resolution. The second and third of the foregoing advantages tend to greatly enhance the signal-to-noise ratio of the spectrometer due to the more efficient use of the incident light.

Infrared absorption spectroscopy and Raman spectroscopy are two related spectroscopic techniques that give very similar information about molecular structure. Both determine vibrational frequencies of the molecule from about 500 to 5000 cm$^{-1}$ (i.e. from about 2 to 20 $\mu$m wavelength). While the present invention may be employed in both infrared absorption spectroscopy and Raman spectroscopy, as well as other methods of spectroscopy, the inventor has recognized that Raman spectroscopy has several features that make a small or even miniature Raman spectrometer practical:

(1) The light source for Raman spectroscopy is a single collimated pump laser 20 rather than a broadband infrared source, as in infrared spectroscopy;

(2) The Raman signal is in a relatively narrow optical band surrounding the pump laser wavelength;

(3) Raman spectroscopy can be done with a room temperature silicon detector 50 rather than requiring a mid- to far-infrared detector that requires cooling (e.g., cryogenic cooling) or has low detection sensitivity; and (4) Raman spectroscopy signal increases with increasing concentration from a zero intensity background, whereas infrared absorption spectroscopy signal decreases with increasing concentration from a large background that is related to the illumination intensity.

(5) The detection of low concentrations by Raman spectroscopy is easier, e.g., because of lower shot noise from the background, and it is less susceptible to interference from water in the sample, particularly of biological samples which have high water content.

These attributes may be utilized to enable the reduction of the size and/or the power consumption of the spectrometer, as is desirable for a portable instrument.

To reduce the size further, the light dispersion element, which is commonly a grating in a laboratory spectrometer, is replaced by a scanning mirror 100 in a Michelson interferometer to do Fourier transform Raman spectroscopy. In a Fourier transform spectrometer 10, the light intensity is measured as a function of time as the mirror 100 in one arm of the interferometer is scanned back and forth. This signal is numerically Fourier transformed to give the spectrum. Transform spectroscopy has inherent signal-to-noise advantages that are useful for a small and/or portable instrument. A multiplex advantage obtains in that all wavelengths are measured simultaneously with a single detector, and a throughput advantage obtains in that the spectral resolution can be increased without using a slit to block a portion of the light.

FIG. 1 is a schematic block diagram of an example embodiment of a spectrometer 10 including an interferometer and scanning mirror in accordance with the present invention. The spectrometer 10 is a Raman type interferometer in which the light produced by laser 20 impinges upon sample S and the Raman scattered light spectrum therefrom is detected 50 and analyzed. Spectrometer 10 includes a scanning Michelson interferometer. Optical fiber coupler 40 couples part of the light beam from sample S to a fixed mirror 44 and part to a scanning mirror 100, 110. Spectrometer 10 employs a scanning mirror 100, 110 according to the invention and performs analysis of the light spectrum from sample S including Fourier transformation.

The light source for Raman pumping is a diode laser 20. The wavelength for Raman spectroscopy is not critical and is determined factors such as sample absorption and available power. Raman pump laser diodes are often in the near infrared part of the spectrum because of these considerations. For high resolution, the laser 20 should be a distributed feedback (DFB) laser that operates at a single wavelength, e.g., 800–900 nm. Output signal from laser back facet monitor 66 can be used by control and data analysis electronics 60 for controlling the laser 20. The light output 26 of the laser 20 is coupled via an optical isolator 22 into an optical fiber 24 wherein it is guided into an optical circulator 30 or a wavelength division multiplexer 30 and to the end of sensing optical fiber 32.

Lens 34 images the pump light 26 onto the sample S as it leaves the optical fiber 32, with sample S preferably being at the focus of lens 34. Because of the narrow optical bandwidth of the Raman light, chromatic aberration of lens 34 can be neglected and the same lens collects the Raman scattered light 26' and couples it back into optical fiber 32. The collection efficiency is determined by the solid angle subtended by lens 34 in the image (sample S) side. Lens 34 may be an optical fiber graded index (GRIN) lens.

Raman scattered light 26' will always be collected because the pump light 26 and the Raman scattered light 26' follow the same path. Misalignment of lens 34 will decrease the intensity of the pump light 26 in the sample S, but Raman scattered light 26' will still be collected. The collected Raman light 26' as well as some of pump light 26 that is Rayleigh scattered or reflected by the sample S is guided via optical fiber 36 to the scanning mirror 100 interferometer by the circulator or wavelength division multiplexer 30. The pump light 26 directed back into the interferometer 10 is utilized to determine the fiber-waveguide response function, while the Raman scattered light 26' contains chemical information about the sample S.

A portion of the reflected light 26' is coupled by coupler 40 to and from fixed mirror 44 via optical fiber 42 and another portion of reflected light 26' is coupled by coupler 40 to and from a scannable or scanning mirror 100 via optical fiber 46. For maximum signal, coupler 40 should split the light 26' equally between optical fibers 42 and 46 to mirrors 44 and 100, respectively. Light reflected from fixed mirror 44 interferes with light reflected from scanning mirror 100 and is coupled by coupler 40 and optical fiber 52 to detector 50. Interferences are produced in coupler 40 and are coupled to detector 50 via optical fiber 52 for various relative differences in the distance reflected light 26' travels between coupler 40 and fixed mirror 44 on the one hand and between coupler 40 and scanning mirror 100 on the other hand. Detector 50, e.g., a silicon detector, converts the light impinging thereon to an electrical signal which is amplified by preamplifier 54 and applied to control and data analysis electronics 60 wherein it is analyzed as described below to determine the characteristics of sample S. Both fixed mirror 44 and mirror end surface 110 of movable rod 112 are polished and coated with a high reflectance optical coating, e.g., a metallic coating such as aluminum, silver, gold.

The Michelson interferometer of FIG. 1 is preferably employs multimode optical fibers and/or waveguides 24, 32, 36, 42, 46, 52, and a 3-dB fiber coupler 40. The scan range of scannable mirror 110 determines the resolution of the resulting spectrum, with a longer scan range providing a higher spectral resolution. The spectral range is ultimately theoretically limited by the smallness of the size of the steps of the scan, but in practice is typically limited by the capability of other components, typically the spectral response of detector 50.

While the light paths of laboratory spectrometers are through free space (free-space optics), the preferred embodiments of spectrometer 10, employs light paths that are within optical fibers and/or optical waveguides and/or other optical components (guided-wave optics), thereby to enable reduction of the size of the spectrometer and to make it more physically robust, where such is desired. Fiber 3-dB coupler 40 has one leg as an input port receiving fiber 36, and another as an output port to fiber 52 coupled to detector 50. A third leg of coupler 40 is fiber 42 which is cut, polished and high-reflectance coated to serve as a fixed mirror 44, and a fourth is a port to fiber 46 to scanning mirror 100, 110.

With regard to the spectrometer 10, because the Raman signal 26' has a relatively narrow optical bandwidth, the entire Raman spectrum will be guided and properly split by the 3-dB coupler 40. The 3-dB coupler 40, which may be a fiber circulator or a wavelength division multiplexer, separates the counter propagating pump and Raman beams. An ordinary power splitter could be employed if the additional coupling loss thereof is acceptable. Desirably, coupler 40 has sufficient crosstalk so that some of the Raman excitation from fiber 36 is coupled to detector 50 for use in determining the system spectral response, as is described below. Besides reducing the size of the spectrometer 10, this arrangement eliminates the need to make and to maintain critical alignments and helps to provide a very robust instrument.

Operation of interferometer 10 is controlled by control and analysis electronics 60. Specifically, electronics 60 includes an electronic processor and produces control signals that are coupled to laser 20 by laser driver 64 for causing laser 20 to produce pumped light 26, and receives feedback signals monitoring the laser 20 back facet via monitor 66. The signal produced by detector 50 is the Fourier transform of the spectrum and electronics 60 generates the inverse Fourier transform thereof to produce the actual spectrum. In addition, electronics 60 produces control signals for scanning scannable mirror 100 that are coupled to scanning mirror 100 via mirror driver 62 to cause the scanning thereof in a desired manner. Example scanning mirror 100 includes a mirror face 110 that is moved by forces from a movable magnet 122 which is mechanically moved by a motor 120, as is described in detail below, as are alternative embodiments thereof.

Control and data analysis electronics 60 receives as an input control signals for controlling operation of interferometer 10 and provides data out signals representative of analyzed measured data for sample S. A power conditioning and distribution device 70 receives electric input power, conditions the input power to the voltages and currents required by the various elements of interferometer 10, and distributes conditioned power thereto.

Figure 2A:
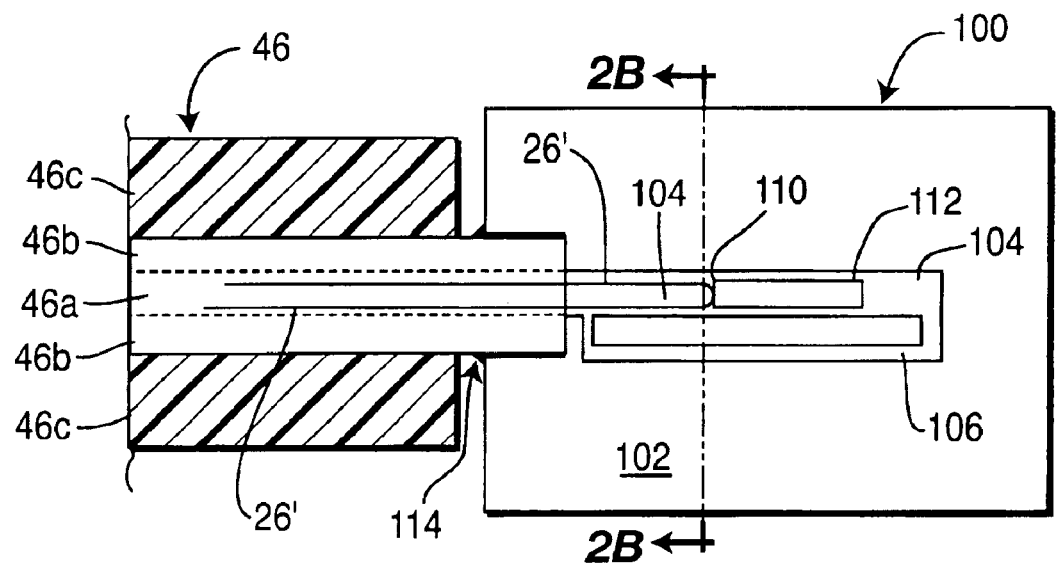
FIGS. 2A and 2B are cross-sectional schematic diagrams of an example embodiment of a scanning mirror for the example embodiments of FIG. 1.
Figure 2B:
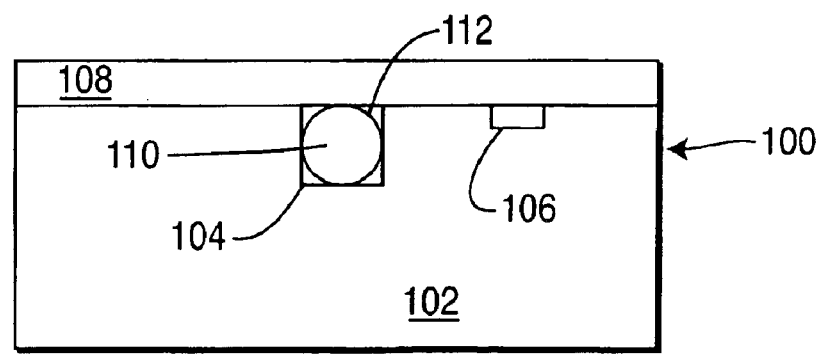

FIGS. 2A and 2B are plan view and end view cross-sectional schematic diagrams of an example embodiment of a scannable or scanning mirror 100 useful in the example embodiments of FIG. 1. Scanning mirror 100 is an important component of Fourier transform spectrometer 10 because the scan range of scanning mirror 100 determines the spectral resolution of spectrometer 100. A scan range (stroke) of about 1 cm provides reasonable spectral resolution. While a longer stroke could easily be provided and would provide greater spectral resolution, such resolution is typically not necessary for typical liquid or solid samples.

Scannable scanning mirror 100 is the most difficult component of instrument 10 to miniaturize, and is preferably implemented by a micro-electro-mechanical structure (MEMS) waveguide of which various embodiments are described herein in detail, e.g., in relation to FIGS. 2A, 2B, 3A, 3B, and 4. Besides reducing the size of the spectrometer, this arrangement eliminates the need to make and to maintain critical alignments and makes for a very robust instrument.

Details of a generic MEMS-waveguide scanning mirror 100 are shown in FIGS. 2A and 2B. Scanning mirror 110 is provided by a polished and metalized end 110 of a rod 112 that is movably disposed in a liquid-filled channel 104 providing an optical waveguide in a glass substrate base 102. The width of channel 104 is preferably comparable to the diameter and/or cross-sectional dimension of the core 46a of optical fiber 46. A glass cover 108 is attached, e.g., anodic bonded, to the glass substrate base 102 to provide an upper waveguide clad and to contain the liquid in channel 104 therein. The index of refraction of the liquid is preferably slightly higher than that of the glass 102, 108 so that it forms an optical waveguide in channel 104.

Optical fiber 46 is, e.g., butt-coupled to the liquid waveguide 104 and sealed by sealant 114 to encapsulate the liquid therein. Typically, channel 104 is counterbored to receive the cladded fiber core 46a, 46b. Proper selection and control of the liquid waveguide 104 dimensions and of the indices of refraction of the materials, permits reflection at the fiber-liquid interface 46a, 104 to be made acceptably small. Substrate 102 and cover 108 may be of any suitable optically uniform glass, preferably of the same index of refraction, and a silicone optical fluid is preferred to fill channels 104, 106. Preferably, the index of refraction of the liquid filling channel 104 is about the same as that of fiber core 46a, and the index of refraction of the glass of substrate 102 and cover 108 is about the same as that of fiber cladding 46b, so as to minimize reflection at the interface of core 46a and the liquid in channel 104.

Channel 104 waveguide and bypass channel 106 may be chemically or otherwise etched, laser ablated, sawn, cut, diamond sawn, hot pressed, or otherwise formed, in glass substrate 102. Presently, diamond sawing for channel 104 and chemical etching for channel 106 are thought to be preferred. While a channel having a circular cross-section matching that of the core 46a of fiber 46 would be preferred for optical waveguide performance, an exact match is not necessary, and other considerations may make another shape and/or size desirable. Another suitable combination is for substrate 102 and cover 108 to be of PYREX® glass (which has an index of refraction of about 1.47) with benzene (index of refraction of about 1.50) as the fluid filling channel 104.

The length of the path over which light 26' travels is changed by moving rod 112 (and thus the polished mirrored face 110 thereof) longitudinally in liquid-filed channel 104. Rod 112 and channel 104 preferably have a diameter/dimension that is similar to the diameter of core 46a of optical fiber 46, e.g. about 50–100 µm. Core 46a is surrounded by reflective cladding 46b which is in turn surrounded by a jacket 46c for physical protection. Typically, rod 112 is about 50 µm in diameter/dimension, and channel 104 is slightly larger, e.g., 55–60 µm. Typically, core 46a and rod 112 have a circular cross-section, while channel 104 has a rectangular, square or trapezoidal cross-section. Optical losses due to mismatch of the foregoing dimensions can be compensated, if necessary, by introducing optical losses into the fixed mirror 44 leg or into coupler 40.

Neither rod 112 nor channel 104 need be of circular cross-section, and it is advantageous if they are of different cross-sectional shapes so that rod 112 does not fill channel 104, thereby to provide passages along rod 112 (i.e. between rod 112 and the walls of channel 104) through which the fluid in channel 104 may flow parallel to rod 112 as rod 112 moves longitudinally within channel 104. The viscosity of the fluid filling channel 104 directly affects the ease with which rod 112 moves therein. It is noted, however, that while a rod 112 that moves easily back and forth can be scanned with little power, a rod 112 that is more difficult to move will tend to maintain alignment and will be less susceptible to movement caused by external vibration and other forces. It is also desirable that the rod 112 and channel 104 have well matched cross-sections for keeping rod 112 properly oriented/aligned within channel 104 (i.e. close to coaxial therewith) and for obtaining high reflectivity from mirrored end 110.

In addition, to ease the movement of rod 112 in liquid-filled channel 104, e.g., to avoid the resistance that could be caused by the liquid having to pass between the rod 112 and the walls of channel 104 as rod 112 moves longitudinally therein, a bypass channel 106 may be provided to provide an alternative path for liquid to flow between one end of channel 104 and the other end thereof. Rod 112 may have a circular cross-section, or may be rectangular or octagonal or any other shape compatible with the cross-sectional shape of channel 104. Typically, bypass channel 106 is of smaller cross-sectional dimension than is channel 104.

The range of movement of mirror 110 relates to the resolution attainable and the step size within that movement range determines the spectral range. Rod 112 can be moved back and forth in channel 104 with a travel of about 1 cm by the example drive methods described below. A longer stroke, e.g., greater than about 1 cm, which can easily be implemented, will yield higher spectral resolution, but may not be needed for liquid or solid samples S where a 1 cm stroke already provides a spectral resolution comparable to the line width. To obtain a spectral range of 5000 $cm^{-1}$, which would include all Raman lines of interest for chemical analysis, the step size of the travel of rod 112 must be about 2 $\mu$m. During movement of rod 112, liquid circulates through the liquid bypass channel 106. As a result, the frictional forces resisting the movement of rod 112 are made acceptably small.

Figure 3A:
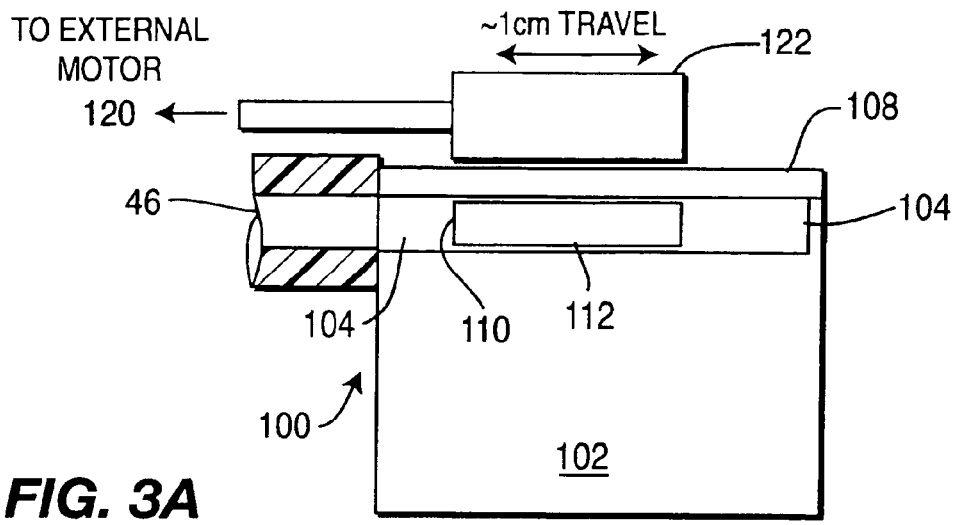
FIGS. 3A and 3B are cross-sectional schematic diagrams of two alternative example embodiments of the scanning mirror for the example embodiment of FIG. 1.
Figure 3B:
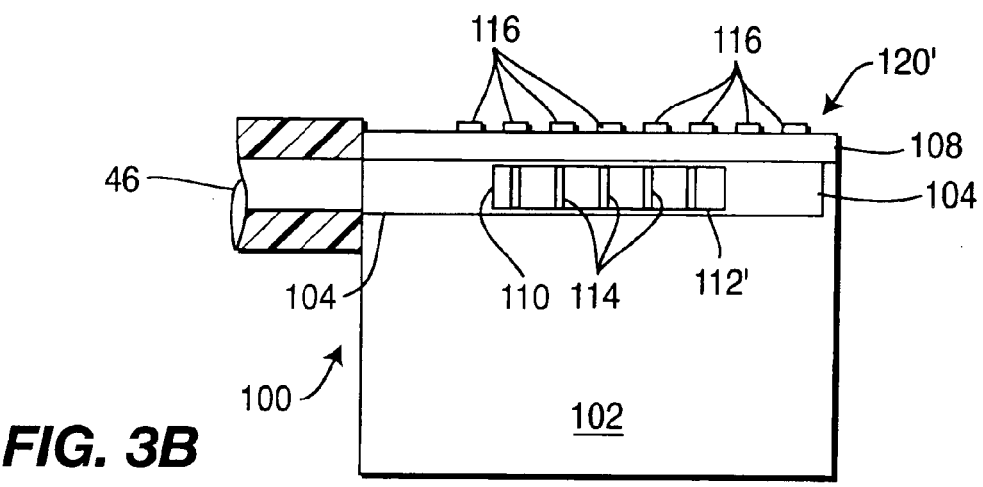

FIGS. 3A and 3B are cross-sectional schematic diagrams of two alternative example embodiments of a motor-driven scanning mirror 100 for the example embodiment of FIG. 1.

In the motor driven scanning mirror 100 of FIG. 3A the scanning mirror facet 110 is a polished end of a ferromagnetic rod 112 that is magnetically translated longitudinally in the liquid-filled waveguide channel 104. An external, linear translation motor 120 is coupled to translate a magnet 122 that magnetically couples to the ferromagnetic rod 112. As the magnet 122 moves or oscillates back and forth adjacent glass cover 108 and parallel to liquid filled waveguide channel 104, the rod 112 will follow magnet 122 if it is made of a magnetic or ferrous material or other ferromagnetic material. Typically, cover 108 is about 0.5 mm or less in thickness.

Rod 112 is typically of a nickel or nickel steel material, but may be made of, coated with or have embedded therein, any magnetic or ferromagnetic material. Movement of magnet 122 may be any suitable motive means, e.g., such as a solenoid, a motor, a lead screw or a stepping motor. Small, low cost, linear translation motors 120 with the needed step size and range of travel are readily available, and are commonly utilized as head drive motors for computer hard drives and CD players.

In the motor driven scanning mirror 100 of FIG. 3B, the scanning mirror facet 110 is a polished end of a dielectric rod 112' that is electrostatically translated longitudinally in the liquid-filled waveguide channel 104. Dielectric rod 112' is driven with a MEMS motor micro-fabricated linear stepping motor 120' having a stator comprising electrodes 116 on glass cover 108 and having a rotor comprising circumferential conductive ring electrodes 114 on dielectric rod 112'.

Rod 112 is preferably a glass or ceramic rod, and electrodes 114,116 are preferably gold over a titanium base.

The combination of rectangular stator electrodes 116 and circumferential rotor electrodes 114 on movable dielectric rod 112 provide a linear stepping motor formed of micro-fabricated elements. Electrodes 116 are typically energized individually to electrostatically pull the nearest stripe electrode 114 into alignment therewith, to provide a vernier positioning control. Electrodes 116 are typically disposed at a different pitch than are electrodes 114. The pitch of electrodes 116 is typically greater than is the pitch of electrodes 114, and the axial width or dimension of electrodes 116 is typically greater than is the axial width of stripe electrodes 114.

Regardless of the drive arrangement utilized to move rod 112, 112' in channel 104, the longitudinal motion of rod 112, 112' can be monitored interferometrically utilizing either the Raman pump laser 20 or a separate laser so that viscous drag on the rod 112, 112' motion can be taken into account. Thus, the linearity and/or accuracy of the movement of mirror 110 need not be highly controlled.

Figure 4:
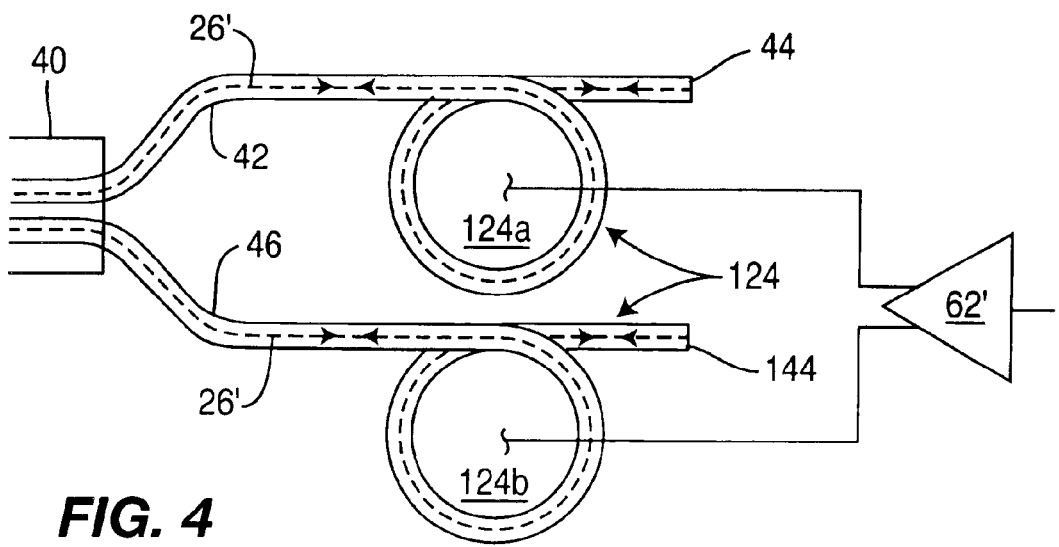
FIG. 4 is a schematic diagram of an example embodiment of a scanning mirror employing differentially variable lengths of optical fiber.

FIG. 4 is a schematic diagram of another example embodiment of a scanning mirror 100 employing differentially variable lengths of optical fiber 42, 46. Each of optical fibers 42, 46 has about the same long length and is wound around a spool, reel or other form 124 many times, and each has a polished mirror end or face 44, 144, respectively. Form 124 comprises two separate forms 124a, 124b on which the respective lengths of fibers 42, 46 are wound. Forms 124a, 124b have a physical characteristic that changes responsive to an electrical signal applied thereto by driver 62'. The electrical signal is applied so as to cause one of forms 124a, 124b to increase in physical size, thereby stretching the length of the one of fibers 42, 46 wound thereon, and the other of forms 124a, 124b to decrease in physical size, thereby allowing the length of the one of fibers 42, 46 wound thereon to shrink.

Suitable materials for forms 124a, 124b include materials with a relatively high coefficient of thermal expansion so that driver 62' applying an electrical signal thereto produces heat (e.g., as in a resistance heater) which raises the temperature of form 124a, 124b causing it to expand. Other suitable materials include piezoelectric and electrostrictive materials that similarly change in physical dimension responsive to the electrical signal applied thereto. In practice, opposing electrical signals are applied simultaneously to both of forms 124a, 124b so that a differential change in lengths of fibers 42, 46 obtains.

To scan the mirrors 44, 144, the electrical signal to one spool 124a is initially at a relatively low value so as to decrease the length of fiber 42 thereon and the signal to the other spool 124b is initially at a relatively high value so as to increase the length of fiber 46 thereon, thereby to differentially change the difference between the lengths of the respective light paths in fiber 42 and fiber 46 to a high value in a first sense (e.g., fiber 42 is shorter than fiber 46). Scanning is provided as the electrical signal applied to form 124a is increased and the electrical signal applied to form 124b is decreased. At the end of the scan, the electrical signal to spool 124a is at a relatively high value so as to increase the length of fiber 42 thereon and the signal to the other spool 124b is at a relatively low value so as to decrease the length of fiber 46 thereon, thereby to differentially change the difference between the lengths of the respective light paths in fiber 42 and fiber 46 to a high value in a second sense opposite to the first sense (e.g., fiber 42 is longer than fiber 46).

Regardless of the drive arrangement utilized for changing the relative sizes of forms 124a, 124b, and therefore the lengths of fibers 42, 46, the difference in lengths thereof can be monitored interferometrically utilizing either the Raman pump laser 20 or a separate laser so that static differences in the lengths of fibers 42, 46, e.g., as may be produced by cutting and manufacturing tolerances, can be taken into account.

As thus far described, spectrometer 10 may employ either single-mode optical fibers or multimode optical fibers, as may be desirable in a given application. Preferably, however, spectrometer 10 employs multimode optical fibers 24, 32, 36, 42, 46, 52 and waveguides 30, 40, 104, because the use of multimode fibers and waveguides tends to increase the efficiency of light coupling into the fiber and to simplify the construction of the scanning mirror 110. A penalty for using multimode fibers 24, 32, 36, 42, 46, 52 is modal dispersion, which will limit the spectral resolution to about 10–100 cm$^{-1}$ absent correction. Modal dispersion arises because the photons travel at different velocities in multimode fibers, which tends to broaden out, and possibly obscure, the peaks in the spectrum.

Figure 6A:
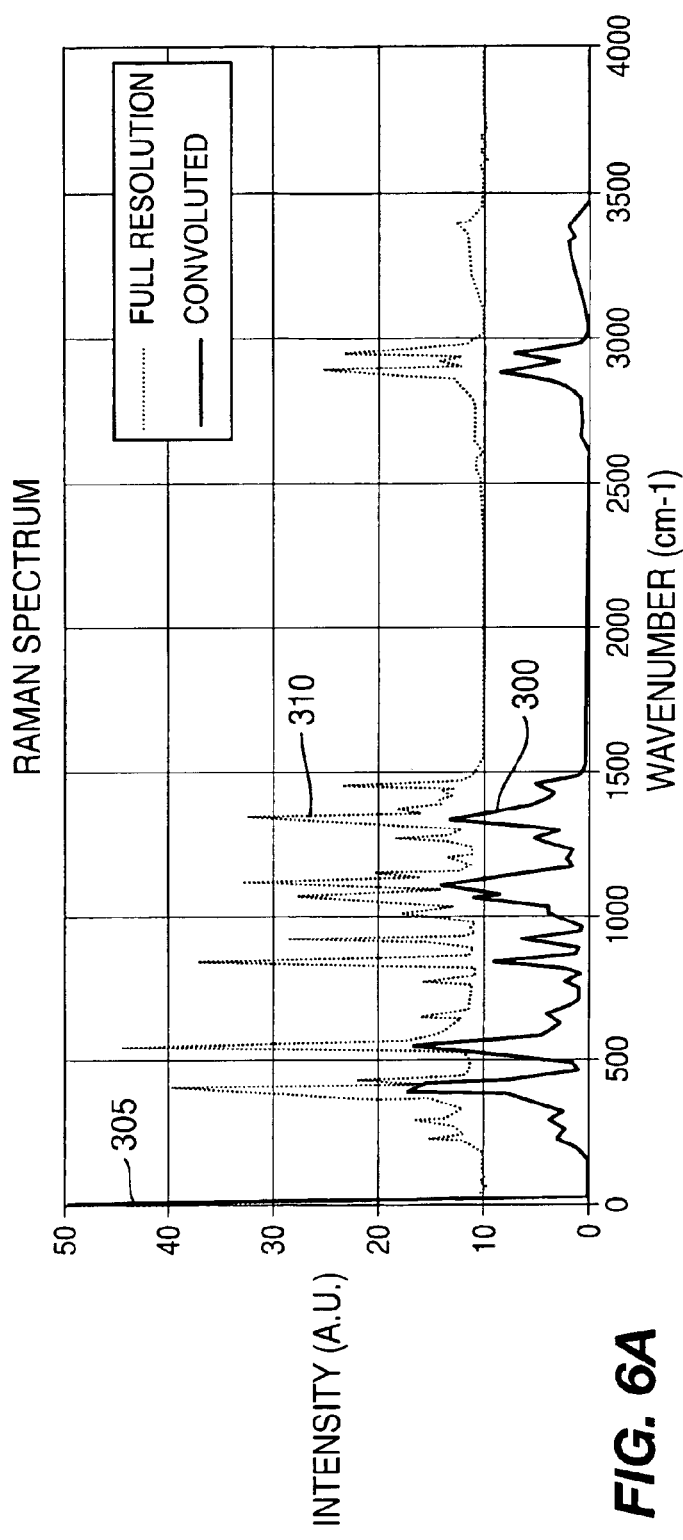
FIG. 6A is a graphical representation of a typical intensity vs. wave number spectrum produced by the interferometer described herein.

Spectrometer 10 cannot differentiate or distinguish between a change in phase velocity and a change in wavelength in a multimode system, and so the observed spectrum with monochromatic light (laser 20) in a multimode system will be the same as some polychromatic spectrum in a single mode system. Thus, the effect of modal dispersion is to convolute the Raman spectrum with this polychromatic spectrum (which is called the fiber-waveguide response function herein). The result of this convolution with a typical fiber-waveguide response function is shown in FIG. 6A. The convoluted spectrum appears to be slightly degraded, but it still retains major spectral features. While the spectrometer may be useful as is, the inventor has discovered how to correct for the modal dispersion in a multimode fiber and/or multimode waveguide system.

To this end, the inventor has recognized that the fiber-waveguide response function can be extracted from the spectrum, e.g., from the Raman spectrum near the origin, and can be utilized to deconvolute the spectrum, thereby to obtain the advantage of multi-mode fibers while avoiding their principal disadvantage. The fiber-waveguide response function typically has a spectral width of about 20 cm$^{-1}$, which is much less than the Stokes shift in the Raman spectrum. The spectrum in the vicinity of the single wavelength Raman pump 20 line is just the fiber-waveguide response function and can be numerically extracted, e.g., by electronics 60.

Among the benefits of obtaining the fiber-waveguide response function in situ is that system drifts due to temperature change, and/or component aging, and/or bending or repositioning of an optical fiber, and/or changes in coupling of light into the optical fiber, are automatically compensated. Moreover, changes resulting from handling (and even some mis-handling) the spectrometer during measurements, such as bending of a fiber or altering of the light coupling into the fiber, may also be automatically compensated. This method, which is described in detail below, not only improves the spectral resolution by removing the effects of modal dispersion, but also greatly enhances the spectrometer performance in the uncontrolled environments that a non-laboratory instrument, such as a hand-held instrument, will see service.

Figure 5:
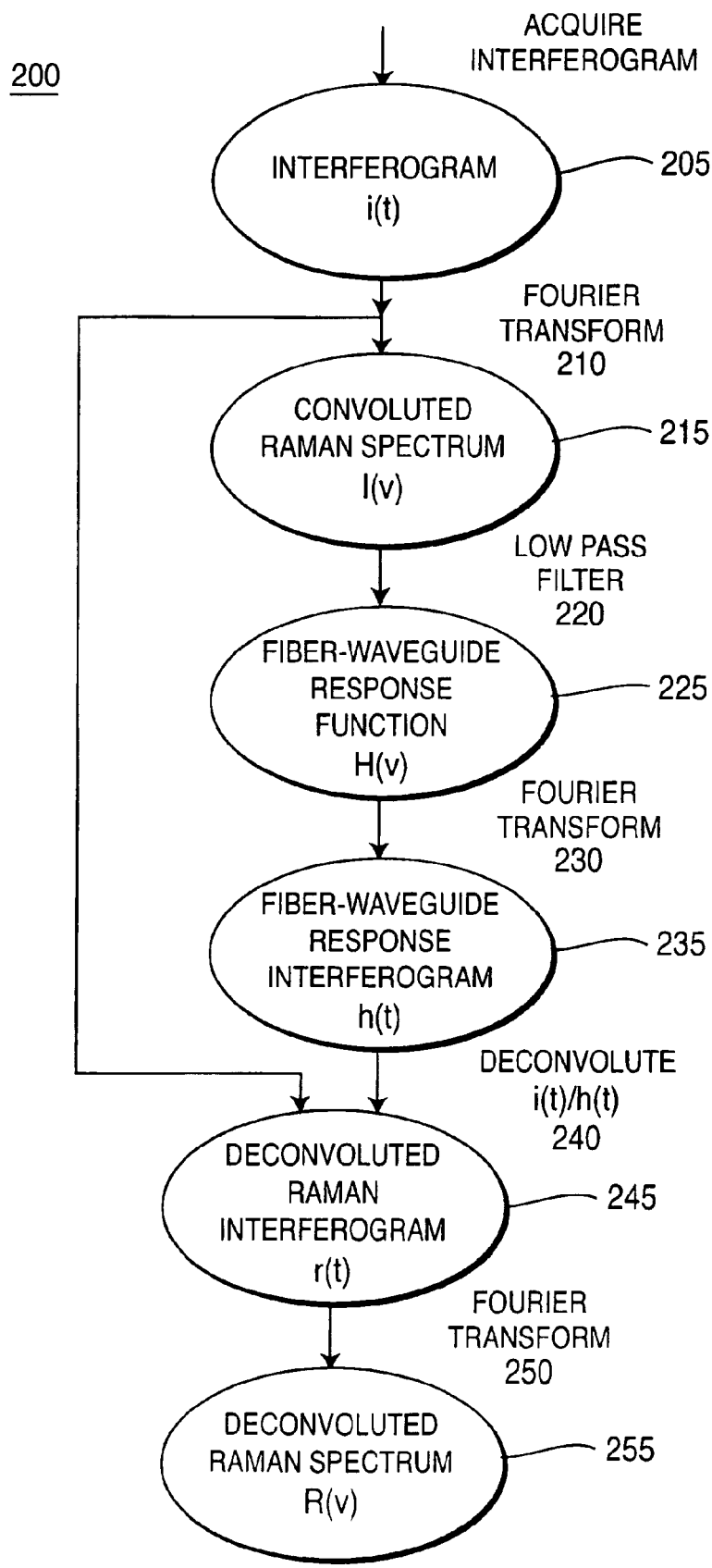
FIG. 5 is a schematic flow diagram of a deconvolution process useful in accordance with the invention.
Figure 6B:
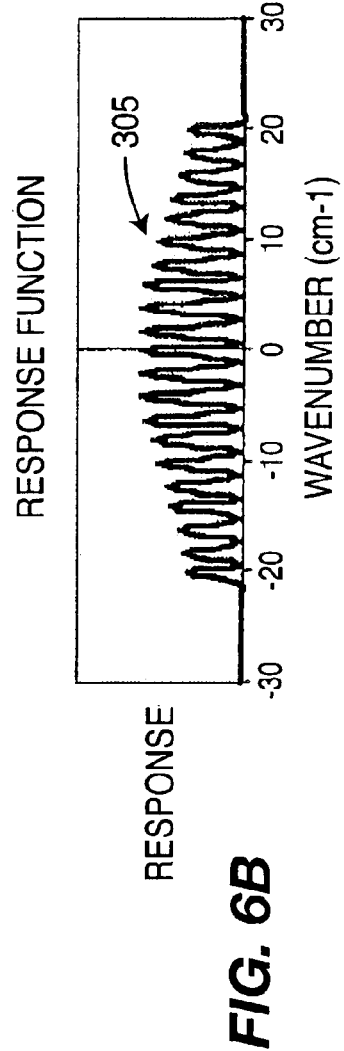
FIG. 6B is an expanded detail of the reference response of the reference line of FIG. 6A.

FIG. 5 is a schematic flow diagram of a deconvolution process, or method, 200 useful in accordance with the invention, which is described in relation to FIGS. 6A and 6B. FIG. 6A is a graphical representation of an example Fourier transform Raman spectrum 300, 310 intensity vs. wave number produced by the interferometer 10 described herein, and FIG. 6B is an expanded detail of the response function of the reference line 305 at or near the origin of spectrum 300 of FIG. 6A. Because the modal dispersion introduced by the multimode optical fiber(s) and/or waveguide(s) convolutes the response spectrum of the interferometer, the resulting convoluted spectrum 300 is somewhat degraded from what a full resolution spectrum 310 would be. The degradation is manifest as a spreading of the spectrum peaks, including that of the laser reference line 305 produced by laser pump source 20 which intrinsically has a very sharp, narrow peak.

In the expanded depiction of reference line 305 it is seen that the broadened laser reference line comprises a response function 305 having a relatively narrow spectrum of plural peaks that arise in situ due to the modal dispersion. Even with the spreading of the spectrum 300 peaks, the first peak of each of spectrum 300 and spectrum 310 is only about 20 cm$^{-1}$ wide and is still far removed from (to the right of) the reference line 305, typically spanning about 200–5000 cm$^{-1}$. In other words, there is a significant region, e.g., wave numbers of about 20-200 cm$^{-1}$, between the origin and the first peak of data spectra 300, 310, in which there is no data, and so reference line 305 may be utilized for convoluting the data spectrum 300 to obtain the deconvoluted spectrum 310 which is substantially free of the effects of the modal dispersion introduced by the multimode optical fibers.

Process 200 comprises acquiring 205 a Fourier transform Raman spectrum i(t), which is also known as an interferogram i(t), in a scanning instrument 10 as described. Interferogram i(t) is a function of time t as measured. Fourier transformation 210 is applied to the interferogram to obtain a convoluted 215 Raman spectrum I(v) 300 which is a function of wave number v. Low pass filtering 220, e.g., numerical filtering with about a 10–100 cm$^{-1}$ bandwidth, separates the fiber/waveguide response function H(v) 305 from the spectrum 300 and the response function H(v) is inverse Fourier transformed 230 to obtain the fiber/waveguide response interferogram h(t) 235.

Then, interferograms i(t) and h(t) are deconvoluted 240, e.g., by dividing i(t) by h(t) and Fourier transforming the ratio function i(t)/h(t), to obtain a deconvoluted 245 Raman interferogram r(t) which is in turn Fourier transformed 250 to obtain a deconvoluted 255 Raman spectrum R(v) 310 Because the same multimode distortions affect the interferogram and the response function, the foregoing convolution-deconvolution process removes the effects thereof as they are at the time each measurement is made. As a result, the instrument accuracy is relatively unaffected by changes in and to the components comprising the instrument.

Fourier transformations and inverse Fourier transformations are typically provided by numerical operations, as is numerical filtering, e.g., low-pass filtering, such as in an electronic processor 60 that performs control and data analysis functions.

Where a separate, e.g., auxiliary source is utilized to provide a reference line for processing the spectrum, the inverse Fourier transform of the system response function is obtained directly (i.e. as at the conclusion of step 235 of FIG. 5. The directly obtained response function is then deconvoluted 240 and Fourier transformed 250 as described above.

It is noted that if any of the optical characteristics of the optical fibers and/or waveguides change, e.g., due to temperature, aging, bending and/or stretching of the fiber or other physical and/or mechanical change, changes where light is coupled, changes at optical interfaces, and the like, the in situ laser reference response function 305 distorts in response to the effects of such change, and so the convolution process utilizing that response function automatically includes such effects and compensates therefor. In addition, while the pump laser 20 is described herein as providing measurement also provides the response function 305 utilized in the convolution processing, as is typical in Fourier transform Raman spectroscopy, another laser may be provided to provide a reference line that is distorted by the characteristics of the multimode optical fiber(s) and/or waveguide(s) and is then utilized as the response function in the convolution processing.

A laser or other light source is referred to herein as substantially monochromatic if its light output is at a single frequency or wavelength or is over a bandwidth or range thereof that is sufficiently narrow as to produce a reference line in an interferogram or other measurement spectrum that is sufficiently separated from spectral data produced by a sample being measured that the reference line can be utilized as a response function.

In summary, the Fourier transform Raman spectrometer described herein is suitable for miniaturization, and can be made small enough and robust enough to be embodied in a hand-held instrument that includes the laser light source, all of the optics, and the control and analysis electronics. The spectral resolution of such instrument is expected to be 1 $cm^{-1}$ or better and the spectral range to be 0–5000 $cm^{-1}$. In other words, its performance is expected to be much better than any conventional small spectrometer and to be comparable to a laboratory spectrometer in terms of spectral resolution, spectral range and throughput. Such instrument has utility for chemical and/or biological analysis, chemical and other material identification, and metabolic monitoring. Samples may be, e.g., in gaseous or liquid or solid form.

A typical hand-held spectrometer 10 can be provided in a package about the size of a typical personal digital assistant (PDA). Typical components therefor include a laser source 20 and a detector 50 each pig-tailed to a fiber 24, 52 and about 0.6 cm in diameter and less than about 5 cm long, a 3-dB coupler 40 and a circulator or multiplexer 30 each about 0.5 cm in diameter and less than about 5 cm long, and an electronics board for processor electronics 60 that is about 3 cm by 1 cm. A scanning mirror assembly 100 providing a 1 cm stroke is about 5 cm by 1.5 cm by 1 cm if a MEMS motor 120' is employed and about twice that size if a small linear translation motor 120 (as in a portable CD player) is employed. A laser diode 20 with a light output in the tens of milliwatts and operating at a wavelength of about 700–800 nm is preferred, e.g., for sampling on tissue, however, it may be desirable to operate such laser at a low duty cycle so as to keep the average power output at a level that is safe for the human eye. While such low duty cycle operation would increase the time required to measure a sample, it would result in a reduction of the power necessary to scan mirror(s) 112, 122, 124. For high spectral resolution, laser 20 is preferably a distributed feedback (DFB) laser diode that operates at a single wavelength.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such.

While the present invention has been described in terms of the foregoing exemplary embodiments, variations within the scope and spirit of the present invention as defined by the claims following will be apparent to those skilled in the art. For example, while a reflective illumination of a sample S to produce a Raman spectrum is illustrated, the instrument and/or scanning mirror described herein may be utilized where a sample S is transmissively illuminated to produce an absorption spectrum.

Further, while magnetic and electrostatic means are described for imparting motion to rod 112 in channel 104, other means may also be employed. Such other means might include thermal means, such as a bimetallic or other thermally expansive element, and/or piezoelectric means, such as a piezoelectric element. Mirror 110 on rod 112 may be a polished end thereof or a mirror attached thereto.

Apparent movement of the mirror, e.g., by optically lengthening and/or shortening of the light path, may be effected by altering, e.g., either thermally or electrically, the index of refraction of the liquid that fills channel 104 without moving the rod 112, so long as the index of refraction of the liquid remains higher than that of the glass 102, 108 so as to maintain waveguide action of channel 104. While the extent of the apparent movement is quite limited, it could be utilized to provide a position vernier for rod 112 in combination with the other means for moving rod 112 described herein.

Scannable (i.e. able to scan) or scanning are used interchangeably herein to denote the feature of a mirror that may be moved to provide an optical scanning function and the optical scanning function itself, as should be clear from the context. While one mirror of the Michelson interferometer is described as scanning and the other as being fixed in certain embodiments herein, either one or both mirrors may be scanned in any embodiment. Where both mirrors are scanned, they are preferably scanned in opposite directions, i.e. 180° out of phase with each other, so as to double the scan range and the resulting spectral resolution. Thus, respective scanning mirror assemblies 100 could be placed at the respective ends of both of fibers 42 and 46.

Lens 34 may be at the surface of a container for spectrometer 10, i.e. may be flush with or slightly raised or recessed, or may be at the end of an optical fiber cable extending therefrom. In addition, an optical fiber cable could be placed with one end against lens 34 and the other end against sample S, so as to make measurement for convenience or to measure a sample S in a confined or awkward location.

While certain electrical signals are described as being "high" or "low" values, it is understood that this may refer to magnitude of voltage or current or power, or may refer to being of negative and positive polarities, or may refer to being more negative or more positive.

What is claimed is:

1. An instrument for performing interferometry comprising:

first and second lengths of multimode optical fiber;

an optical coupler for coupling light to and from respective first ends of said first and second lengths of multimode optical fiber;

a first mirror at a second end of said first multimode optical fiber for reflecting the light therein;

a second mirror at a second end of said second multimode optical fiber for reflecting the light therein;

wherein at least said first mirror is a scannable mirror;

means for scanning said scannable mirror;

a detector coupled to said optical coupler for receiving at least a portion of the light reflected from said first and second mirrors and producing an output signal representative thereof;

wherein said first and second multimode optical fibers produce a modal dispersion of light therein and an effect of modal dispersion is present in the output signal produced by said detector, and a processer coupled to said detector for reducing the effect of modal dispersion of the output signal.

2. The instrument of claim 1 wherein said means for scanning comprises:

a member movable in a fluid-filled optical waveguide and carrying said first mirror, and a motor for moving the member in the fluid-filled optical waveguide; and/or an expandable and contractible core around which said first multimode optical fiber is wound.

3. The instrument of claim 2 wherein said member includes magnetic and/or ferromagnetic material, and wherein said motor includes a magnet moveable longitudinally adjacent the fluid-filled optical waveguide.

4. The instrument of claim 2 wherein said motor is an electrostatic motor having a plurality of electrodes spaced apart along the fluid-filled optical waveguide, and wherein said member is dielectric and includes a plurality of spaced apart electrodes thereon.

5. The instrument of claim 2 wherein said expandable and contractible core includes a thermally expansive material, a piezoelectric material, and/or an electrostrictive material, further comprising;

means for applying an electrical signal to said core to cause the piezoelectric material and/or electrostrictive material thereof to expand and contract, and/or for applying an electrical signal to a heater element proximate said core to cause the thermally expansive material thereof to expand and contract.

6. The instrument of claim 1 wherein both of said first and second mirrors are scannable mirrors, and wherein said means for scanning scans the first and second mirrors oppositely.

7. The instrument of claim 1 further comprising a multimode optical fiber for coupling said detector and said optical coupler.

8. An instrument for performing spectroscopy comprising:

a laser for illuminating a sample with light;

a first length of multimode optical fiber for receiving light reflected from or passing through the sample;

second and third lengths of multimode optical fiber;

an optical coupler for receiving light from said first length of multimode optical fiber and for coupling light to and from respective first ends of said second and third lengths of multimode optical fiber;

a first mirror at a second end of said second multimode optical fiber for reflecting the light therein;

a second mirror at a second end of said third multimode optical fiber for reflecting the light therein;

wherein at least said first mirror is a scannable mirror;

means for scanning said scannable mirror;

a detector coupled to said optical coupler for receiving at least a portion of the light reflected from said first and second mirrors for producing an output signal representative thereof;

wherein said first, second and third multimode optical fibers produce a modal dispersion of light therein and an effect of modal dispersion is present in the output signal produced by said detector; and a processor coupled to said detector for reducing the effect of modal dispersion of the output signal.

9. The instrument of claim 8 wherein said means for scanning comprises:

a member movable in a fluid-filled optical waveguide and carrying said first mirror, and a motor for moving the member in the fluid-filled optical waveguide; and/or an expandable and contractible core around which said second multimode optical fiber is wound.

10. The instrument of claim 9 wherein said member includes magnetic and/or ferromagnetic material, and wherein said motor includes a magnet moveable longitudinally adjacent the fluid-filled optical waveguide.

11. The instrument of claim 9 wherein said motor is an electrostatic motor having a plurality of electrodes spaced apart along the fluid-filled optical waveguide, and wherein said member is dielectric and includes a plurality of spaced apart electrodes thereon.

12. The instrument of claim 9 wherein said expandable and contractible core includes a thermally expansive material, a piezoelectric material, and/or an electrostrictive material, and wherein said processor applies an electrical signal to said core to cause the piezoelectric material and/or electrostrictive material thereof to expand and contract, and/or for applying an electrical signal to a heater element proximate said core to cause the thermally expansive material thereof to expand and contract.

13. The instrument of claim 8 wherein both of said first and second mirrors are scannable mirrors, and wherein said means for scanning scans the first and second mirrors oppositely.

14. A method for reducing the effect of modal dispersion in an optical instrument resulting from at least one multimode optical element therein, the method comprising:

providing a source of substantially monochromatic light;

detecting spectral data responsive to the substantially monochromatic light, the spectral data including effects of modal dispersion;

detecting a response function responsive to the substantially monochromatic light, the response function including effects of modal dispersion; and convolving the spectral data and the response function for producing deconvoluted spectral data wherein effects of modal dispersion are reduced.

15. The method of claim 14 wherein said providing a source of light includes providing substantially monochromatic light at a first wavelength for said detecting spectral data and said detecting a response function.

16. The method of claim 14 wherein said providing a source of light includes:

providing substantially monochromatic light at a first wavelength for said detecting spectral data; and providing substantially monochromatic light at a second wavelength for said detecting a response function.

17. The method of claim 14 wherein said detecting a response function comprises extracting the response function from the spectral data.

18. The method of claim 17 wherein said extracting comprises convolving the spectral data and low-pass filtering the convolved spectral data.

19. The method of claim 14 wherein said convolving comprises:

dividing one of the spectral data and the response function by the other thereof; and Fourier transforming the divided spectral data and response function.

20. The method of claim 14 wherein said detecting a response function comprises:

Fourier transforming the spectral data responsive to the substantially monochromatic light;

low-pass filtering the transformed spectral data; and inverse Fourier transforming the filtered transformed spectral data.

21. A storage medium encoded with machine-readable computer instructions for reducing the effect of modal dispersion in an optical instrument resulting from at least one multimode optical element therein, the optical instrument having a source of substantially monochromatic light, comprising:

means for causing the computer to receive spectral data responsive to the substantially monochromatic light, the spectral data including effects of modal dispersion;

means for causing the computer to receive a response function responsive to the substantially monochromatic light, the response function including effects of modal dispersion; and means for causing the computer to convolve the spectral data and the response function for producing deconvoluted spectral data wherein effects of modal dispersion are reduced.

22. The storage medium of claim 21 wherein the source of light provides substantially monochromatic light at a first wavelength for said means for causing the computer to receive spectral data and provides substantially monochromatic light at a second wavelength for said means for causing the computer to receive a response function.

23. The storage medium of claim 21 wherein said means for causing the computer to receive a response function comprises means for causing the computer to extract the response function from the spectral data.

24. The storage medium of claim 23 wherein said means for causing the computer to extract comprises means for causing the computer to convolve the spectral data and means for causing the computer to low-pass filter the convolved spectral data.

25. The storage medium of claim 21 wherein said means for causing the computer to convolve comprises:

means for causing the computer to divide one of the spectral data and the response function by the other thereof; and means for causing the computer to Fourier transform the divided spectral data and response function.

26. The storage medium of claim 21 wherein said means for causing the computer to receive a response function comprises:

means for causing the computer to Fourier transform the spectral data responsive to the substantially monochromatic light;

means for causing the computer to low-pass filter the transformed spectral data; and means for causing the computer to inverse Fourier transform the filtered transformed spectral data.

27. The storage medium of claim 21 wherein said source of light provides substantially monochromatic light at a first wavelength for said means for causing the computer to receive spectral data.

* * * * *